US011822500B2

(12) United States Patent
Halim et al.

(10) Patent No.: US 11,822,500 B2
(45) Date of Patent: Nov. 21, 2023

(54) MESSAGES BASED ON INPUT/OUTPUT DEVICE SIGNALS TO VIRTUAL COMPUTERS

(71) Applicant: Hewlett-Packard Development Company, L.P., Spring, TX (US)

(72) Inventors: Irwan Halim, Spring, TX (US); Lei Man, Shanghai (CN); Kunchen Xie, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 25 days.

(21) Appl. No.: 17/042,145

(22) PCT Filed: Apr. 27, 2018

(86) PCT No.: PCT/US2018/029828
§ 371 (c)(1),
(2) Date: Sep. 27, 2020

(87) PCT Pub. No.: WO2019/209315
PCT Pub. Date: Oct. 31, 2019

(65) Prior Publication Data
US 2021/0034561 A1    Feb. 4, 2021

(51) Int. Cl.
*G06F 13/40*     (2006.01)
*G06F 9/54*      (2006.01)

(52) U.S. Cl.
CPC .......... *G06F 13/4027* (2013.01); *G06F 9/547* (2013.01)

(58) Field of Classification Search
CPC ............................. G06F 13/4027; G06F 9/547
See application file for complete search history.

(56) References Cited

U.S. PATENT DOCUMENTS

| | | | |
|---|---|---|---|
| 5,845,146 A * | 12/1998 | Onodera | ............... G06F 13/122 710/2 |
| 8,738,814 B1 | 5/2014 | Cronin | |
| 8,805,947 B1 | 8/2014 | Kuzkin et al. | |
| 9,870,272 B2 | 1/2018 | Li et al. | |
| 11,159,646 B1 * | 10/2021 | Singh | ..................... H04L 67/10 |

(Continued)

FOREIGN PATENT DOCUMENTS

WO    WO-2014197015 A1    12/2014

OTHER PUBLICATIONS

Easy Remote Desktop Access That's Hard to Beat, FreeConferenceCall. com, Aug. 4, 2018, pp. 1-6.

(Continued)

*Primary Examiner* — Nimesh G Patel
(74) *Attorney, Agent, or Firm* — Quarles & Brady LLP

(57) ABSTRACT

A computer-readable medium may store machine-readable instructions for execution by a processor. There may be a connection between the processor and a virtual computer. The processor may establish a first data channel between the processor and the virtual computer based on the connection between the processor and the virtual computer. The connection may comprise a second data channel to transfer input/output (I/O) data between the processor and the virtual computer. The processor may receive an input signal from an I/O device coupled to the processor. The processor may provide an input message to the virtual computer via the first data channel, the input message based on the input signal.

15 Claims, 8 Drawing Sheets

(56) References Cited

U.S. PATENT DOCUMENTS

| | | |
|---|---|---|
| 2010/0100809 A1 | 4/2010 | Thomas et al. |
| 2011/0202977 A1* | 8/2011 | Ohno ............... H04L 67/59 726/4 |
| 2012/0092277 A1* | 4/2012 | Momchilov ........... G06F 3/041 345/173 |
| 2012/0185528 A1* | 7/2012 | Jaudon ................ G06F 9/54 709/203 |
| 2012/0284768 A1 | 11/2012 | Sabin et al. |
| 2016/0112540 A1* | 4/2016 | Xia ................. H04L 67/10 709/203 |
| 2016/0119410 A1 | 4/2016 | Ahn et al. |
| 2018/0092039 A1* | 3/2018 | Cariou ............ H04W 52/0235 |
| 2019/0138204 A1* | 5/2019 | Halim ................ G06F 3/0236 |

OTHER PUBLICATIONS

Keyboard shortcuts for Skype for Business, Office Support, Aug. 4, 2018, pp. 1-15.

\* cited by examiner

MESSAGES BASED ON INPUT/OUTPUT DEVICE SIGNALS TO VIRTUAL COMPUTERS

BACKGROUND

Virtual computers emulate a computer and may be run on a local computer or on a remote server. Input/Output (I/O) data, such as from a keyboard or mouse, may be transferred to the virtual computer in order to control the virtual computer. I/O data may be transferred from the virtual computer, such as in the form of images to be displayed on a monitor.

BRIEF DESCRIPTION OF THE DRAWINGS

Various examples will be described below referring to the following figures.

DETAILED DESCRIPTION

In one example in accordance with the present disclosure, an apparatus is provided. The apparatus comprises a non-transitory computer-readable medium storing machine-readable instructions that are, when executed by a processor, to cause the processor to: establish a first data channel between the processor and a virtual computer based on a connection between the processor and the virtual computer, the connection comprising a second data channel between the processor and the virtual computer, the second data channel to transfer input/output (I/O) data between the processor and the virtual computer; receive an input signal from an I/O device coupled to the processor; and provide an input message to the virtual computer via the first data channel, the input message based on the input signal.

In one example in accordance with the present disclosure, a method is provided. The method comprises establishing a first data channel between a processor and a virtual computer based on a connection between the processor and the virtual computer, the connection comprising a second data channel between the processor and the virtual computer, the second data channel to transfer input/output (I/O) data between the processor and the virtual computer; receiving an input signal from an I/O device coupled to the processor; and providing an input message to the virtual computer via the first data channel, the input message based on the input signal, where the I/O data corresponding to the input signal is not transferred via the second data channel.

In one example in accordance with the present disclosure, an apparatus is provided. The apparatus comprises a non-transitory computer-readable medium storing machine-readable instructions that are, when executed by a virtual computer, to cause the virtual computer to: establish a first data channel between the virtual computer and a processor based on a connection between the virtual computer and the processor, the connection comprising a second data channel between the virtual computer and the processor, the second data channel to transfer input/output (I/O) data between the processor and the virtual computer; receive an input message from the processor via the first data channel, the input message based on an input signal from an I/O device coupled to the processor; and process the input message.

Figure 1:
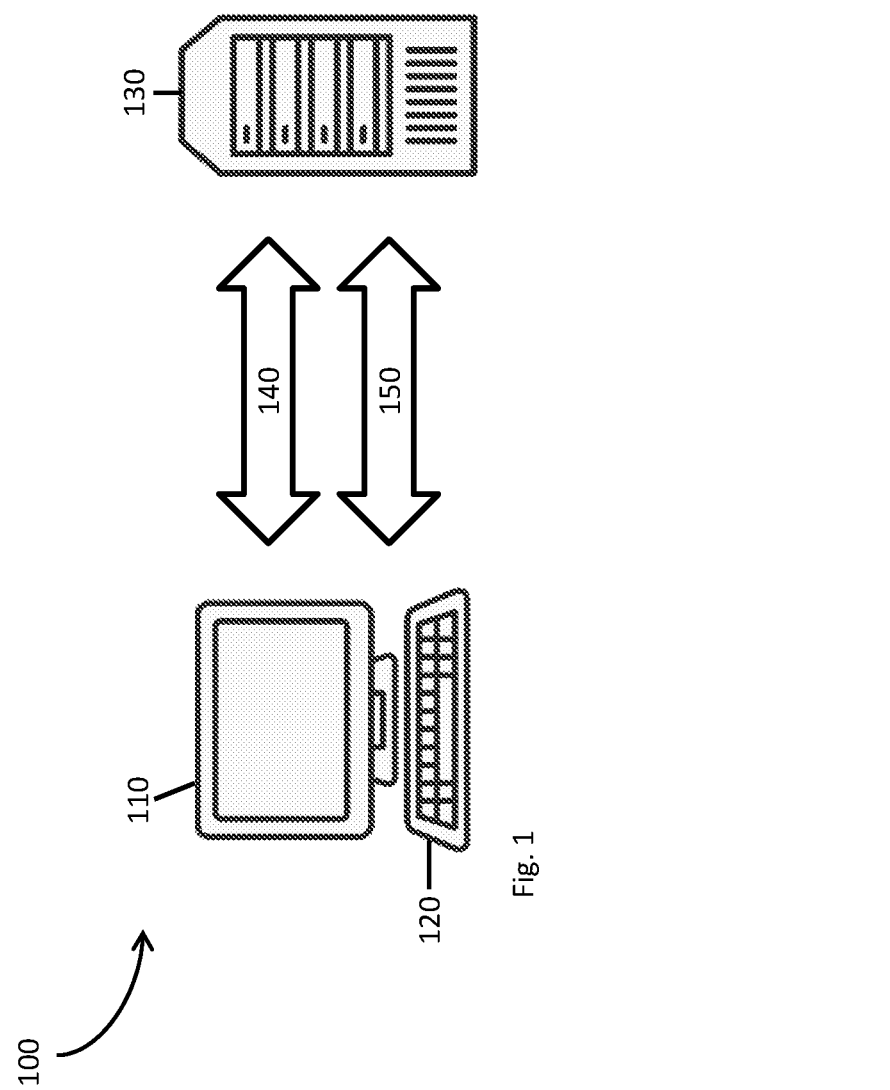
FIG. 1 shows a computer system and server to run a remote desktop in accordance with various examples.

FIG. 1 shows a computer system 110 and server 130 to run a remote desktop in accordance with various examples. Computer system 110 may include I/O devices, such as a keyboard 120. Computer system 110 may include other I/O devices, such as a mouse, trackball, microphone, camera, light pen, joystick, monitor, speakers, printer, Voice over Internet Protocol (VoIP) headset, or custom I/O devices. The I/O devices may be coupled to the computer system by a Universal Serial Bus (USB), Bluetooth, or another system. The I/O devices may be removable from the computer system, such as a USB device, or built into the system, such as a button on a mobile phone or tablet. The I/O devices may comprise buttons, switches, displays, or other forms of input or output. For a display I/O device, the screen may be activated if in a power-saving mode and a graphical element may be displayed and interacted with, such as via touch for a touchscreen, or using a mouse, trackball, stylus, or similar I/O device. Server 130 may execute a virtual computer. Computer system 110 may establish a connection 140 to the virtual computer executed on server 130. Computer system 110 may, for example, access a remote desktop being run using a virtual computer on server 130. Connection 140 may include a data channel that transfers I/O data, such as I/O data from the keyboard 120. The keypresses on the keyboard 120 may be transferred over the data channel of connection 140 to the virtual computer being executed on server 130. The virtual computer may transfer images over the data channel of connection 140 to the computer system 110 to display on a monitor. Computer system 110 may be a laptop computer, desktop computer, mobile phone, tablet, or other computer system.

Computer system 110 may establish a data channel 150, based on connection 140. Data channel 150 may be called a first data channel, and the data channel of connection 140 may be called a second data channel. Data channel 150 may transfer I/O data between the computer system 110 and the virtual computer on the server 130. The I/O data transferred via data channel 150 may overlap with the I/O data transferred over the data channel of connection 140. The I/O data transferred via data channel 150 may be additional to the I/O data transferred over the data channel of connection 140. For example, keyboard 120 may comprise a button for which, when pressed, no corresponding I/O data is transferred over the data channel of connection 140. This button may, for example, be intended to open up an e-mail application and use a special device driver or application running on the computer system 110 to process the signal from the keyboard 120. Pressing another key on keyboard 120, such as "Q," "J," or "Z" may cause corresponding I/O data to be transferred over the data channel of connection 140. When the e-mail button on keyboard 120 is pressed, computer system 110 may transfer the I/O data by providing a corresponding input message to the virtual computer on server 130 via data channel 150. The virtual computer on server 130 may then process the input message, which may cause the virtual computer to open an e-mail application.

Computer system 110 may comprise an application to interface with the I/O device and data channel 150. Used herein, an application is meant to encompass programs, services, daemons, device drivers, libraries, executables, and other sets of machine-readable instructions. The application may detect that a connection 140 has been established between the computer system 110 and a virtual computer, such as a virtual computer executing on a server 130. Based on detection of the connection 140, the computer system 110 may establish a data channel 150 between the computer system and virtual computer. A data channel of connection 140 and data channel 150 may both transfer input and output messages corresponding to I/O devices or even to the same I/O device. The virtual computer on server 130 may comprise an application to interface with data channel 150. The virtual computer's application may receive input messages corresponding to I/O devices of computer system 110 via data channel 150. The virtual computer's application may process those input messages. For example, if an e-mail button is pressed on keyboard 120, the application on computer system 110 may provide a corresponding input message over data channel 150. The virtual computer's application may receive the input message and process the input message to recognize a request to open an e-mail application. Pressing such a button may close an application, such as the e-mail application. The virtual computer's application may cause the virtual computer on server 130 to open the e-mail application in response to receiving the input message. In various examples, the virtual computer may be executed on a server 130 that is located remotely from computer system 110 or in close proximity to computer system 110. The virtual computer may be executed on the computer system 110 and the connection and data channels may operate via procedure or function calls between the various applications or exchanged through TCP/IP. The virtual computer may be a virtual machine.

Figure 2:
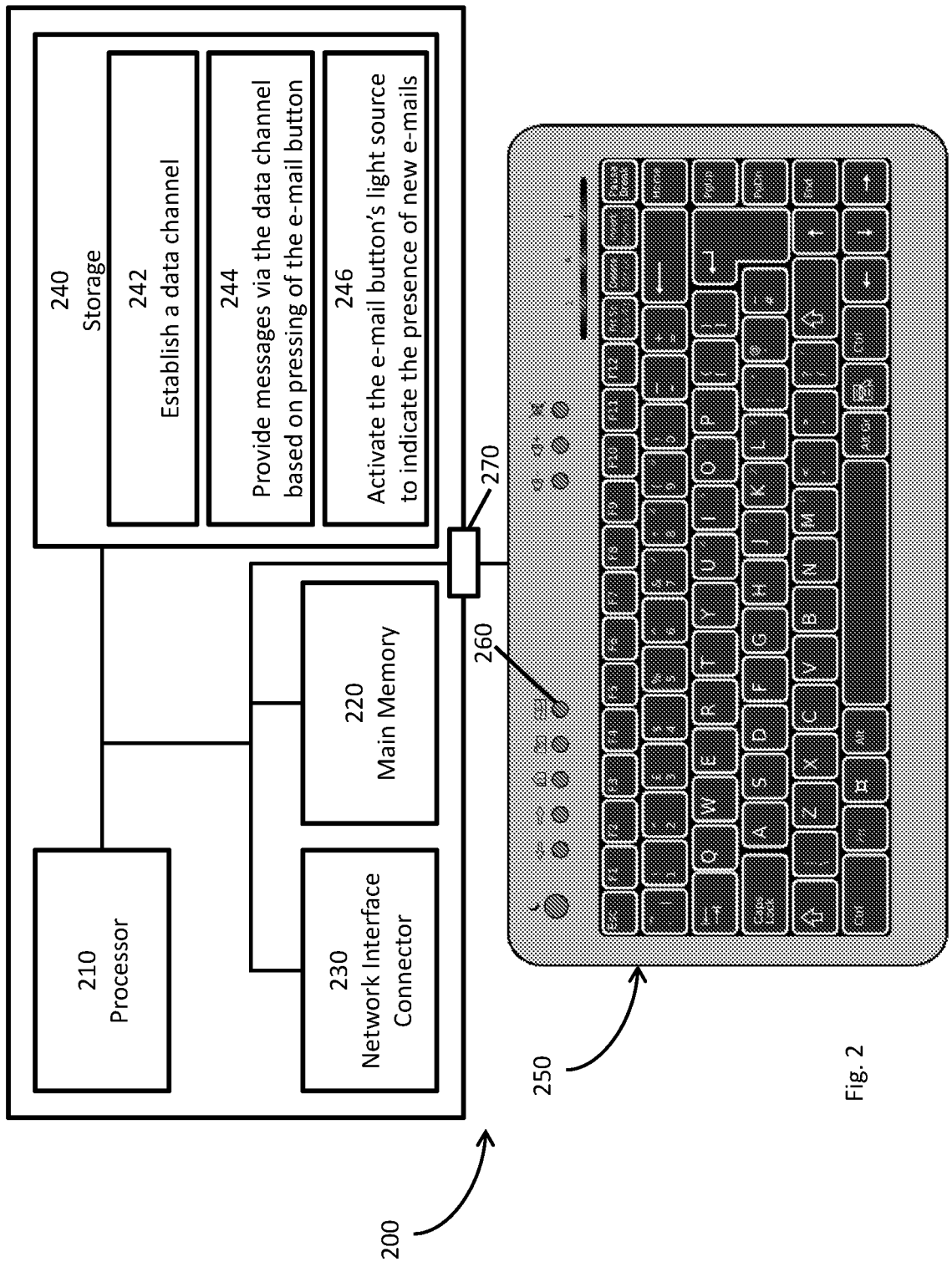
FIG. 2 shows a computer system with a keyboard in accordance with various examples.

FIG. 2 shows a computer system 200 with a keyboard 250 in accordance with various examples. Computer system 200 may comprise a processor 210, main memory 220, a network interface connector 230, storage 240, keyboard 250, and bus connector 270. Processor 210 may comprise a microprocessor, a microcomputer, a controller, a field programmable gate array (FPGA), or discrete logic to execute machine-readable instructions. Main memory 220 may comprise a random access memory (RAM), such as dynamic RAM (DRAM) or static RAM (SRAM), Flash memory, or electrically erasable programmable read only memory (EEPROM). Network interface connector 230 may comprise a network device to provide an Ethernet connection, wireless connection, or other connection. Network interface connector 230 may enable access to a private corporate network. Network interface connector 230 may enable access to the Internet. Storage 240 may comprise non-volatile or long-term storage for data or machine-readable instructions, such as a hard drive, solid state drive (SSD), Flash memory, or EEPROM. Processor 210, main memory 220, network interface connector 230, storage 240, and bus connector 270 may be coupled together, such as with a bus. Storage 240 may comprise machine-readable instructions 242, 244, 246 to be executed by processor 210. Main memory 220 may act as a cache for data transferred between storage 250 and processor 210. Processor 210 may transfer messages across a data channel via network interface connector 230.

Computer system 200 may comprise a processor 210 coupled to I/O devices, such as keyboard 250. Computer system 200 may be a server to execute a virtual computer. Keyboard 250 may be coupled to processor 210 via the bus connector 270. The bus connector 270 may be a serial bus connector, USB connector, or other connector allowing the connection of peripherals or I/O devices to the processor 210. Keyboard 250 may include various keys representing alpha-numeric or special characters. Keyboard 250 may include e-mail button 260. When pressed while using a local computer system 200, e-mail button 260 may cause the computer system 200 to open up an e-mail application, such as if the e-mail application is not open, or switch to the e-mail window by bringing the e-mail window to the front of a graphical user interface and giving it focus. Keyboard 250 may include additional buttons, such as a button to cause the computer system 200 to enter a sleep mode, a button to cause the computer system 200 to cycle through open applications or windows, a button to minimize all windows, or a button to open up a file folder. When the local machine is connected to a virtual computer, a press of the e-mail button 260 on keyboard 250 may not be transferred by the connection to the virtual computer. Computer system 200 may execute an application including machine-readable instructions 242, 244, 246. Machine-readable instruction 242, when executed, may cause processor 210 to establish a data channel 242, such as a data channel between the processor 210 and the virtual computer. Machine-readable instruction 244, when executed, may cause processor 210 to provide messages via the data channel based on pressing of the e-mail button 260. The messages may be provided to the virtual computer. The virtual computer may execute an application that receives and processes such messages, opening an e-mail application on the virtual computer in response to the e-mail button 260 being pressed. E-mail button 260 may comprise a light source that may be turned on or off to indicate the presence of new e-mails. Machine-readable instruction 246, when executed, may cause processor 210 to activate the e-mail button's 260 light source to indicate the presence of new e-mails.

Figure 3:
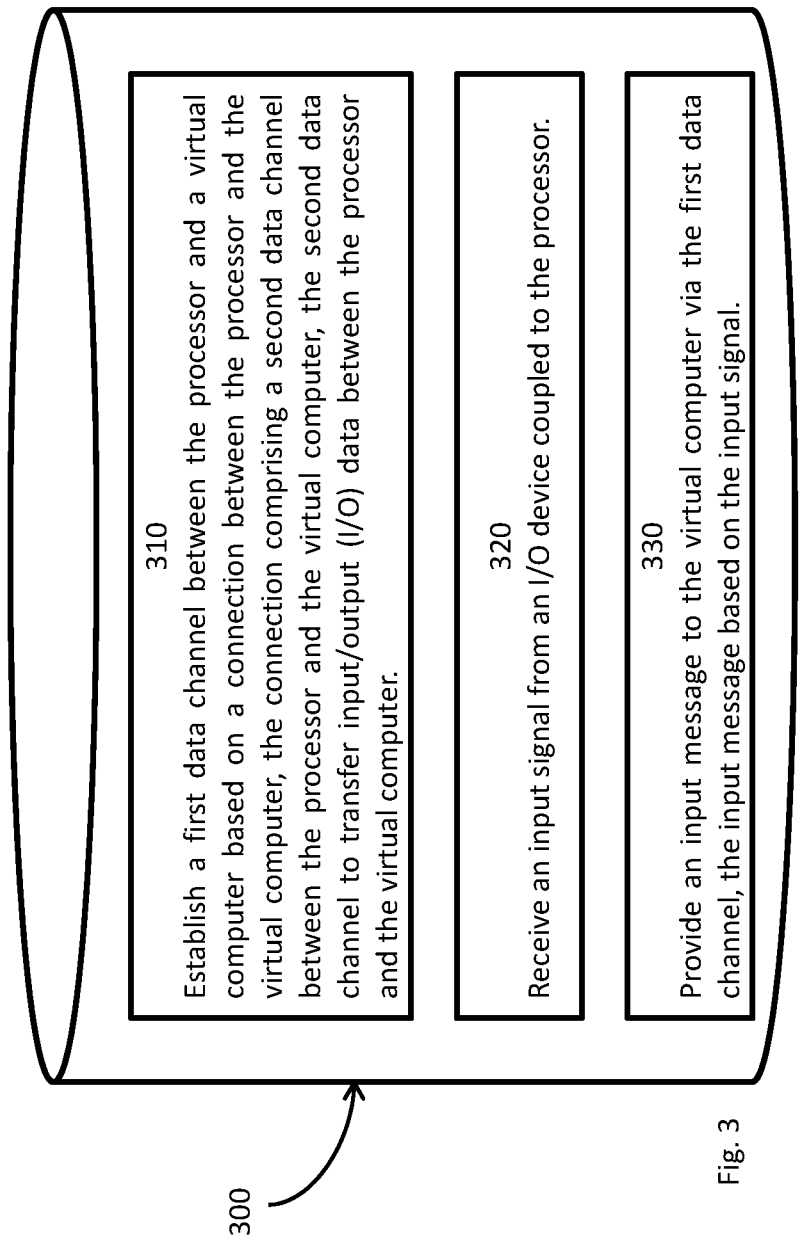
FIG. 3 shows a computer-readable medium with machine-readable instructions to be executed by a processor in accordance with various examples.

FIG. 3 shows a computer-readable medium 300 with machine-readable instructions 310, 320, 330 to be executed by a processor in accordance with various examples. Computer-readable medium 300 may be storage, such as a hard drive, solid state drive (SSD), Flash memory, or EEPROM. Machine-readable instruction 310, when executed, may cause the processor to establish a first data channel between the processor and a virtual computer based on a connection between the processor and the virtual computer, the connection comprising a second data channel between the processor and the virtual computer, the second data channel to transfer input/output (I/O) data between the processor and the virtual computer. Machine-readable instruction 320, when executed, may cause the processor to receive an input signal from an I/O device coupled to the processor. Machine-readable instruction 330, when executed, may cause the processor to provide an input message to the virtual computer via the first data channel, the input message based on the input signal.

Machine-readable instructions 310, 320, 330 may be part of an application to be executed by the processor. The application may detect a connection between the processor and a virtual computer. The application may detect the connection by monitoring the processes and services running on the computer system and identifying which processes or services may establish such a connection. The application may detect the connection by querying another application if a connection exists. The application may detect the connection by monitoring a notification system that provides a notification when such a connection is created. The application may detect the connection by analyzing the title bars of windows or the contents of the windows. For example, a title bar or window may include an indication of such a connection, such as "connecting to" followed by a TCP/IP address. The application may also monitor network traffic to detect the connection or determine how to connect to the virtual computer, such as by a particular TCP/IP address. The application may also establish a connection based on interaction with a user, such as the user specifying a TCP/IP address to connect to. In various examples, the connection between the processor and the virtual computer may allow the creation of data channels. The application may create and use a data channel through the connection.

The application may register with a device driver or other application to receive an input signal from an I/O device. The input signal may be in the form of notification of an I/O event corresponding to the I/O device. The application may receive notification of all I/O event relating to the I/O device, or the application may receive notification of certain I/O events, such as the press of an e-mail button. The application may create an input message for delivery to the virtual computer, based on receipt of the input signal. The format of the input message may differ based on the details of the particular data channel established. The input message may comprise a device identifier for the I/O device, an indication of what I/O event took place, and a timestamp indicating when the I/O event took place. The application may process the input message to determine what action is to be performed by the virtual computer. The input message may comprise an application identifier and action to be performed by the virtual computer, such as identifying an e-mail application and an action to "open" the e-mail application. The application may be part of a device driver stack or have a corresponding component that is part of the device driver stack, where the input is processed by each member of the stack, which may modify the output for later members of the stack. For example, the application may receive notification for every press of a key or button on a keyboard. The application may pass along such notifications to the next member of the stack, except for notifications relating to the e-mail button, which may be handled by the application and not be passed along to the next member of the stack. The application may modify notifications or add notifications before passing them along to the next member of the device driver stack. The application may provide input messages to the virtual computer in response to receipt of some input signals, but cause actions to be taken by the processor of the local computer system in response to receipt of other input signals. For example, an e-mail button may open up an e-mail application on the virtual computer, but a sleep button may cause the local computer system to be put into a sleep mode, rather providing an input message to the virtual computer to process.

Figure 4:
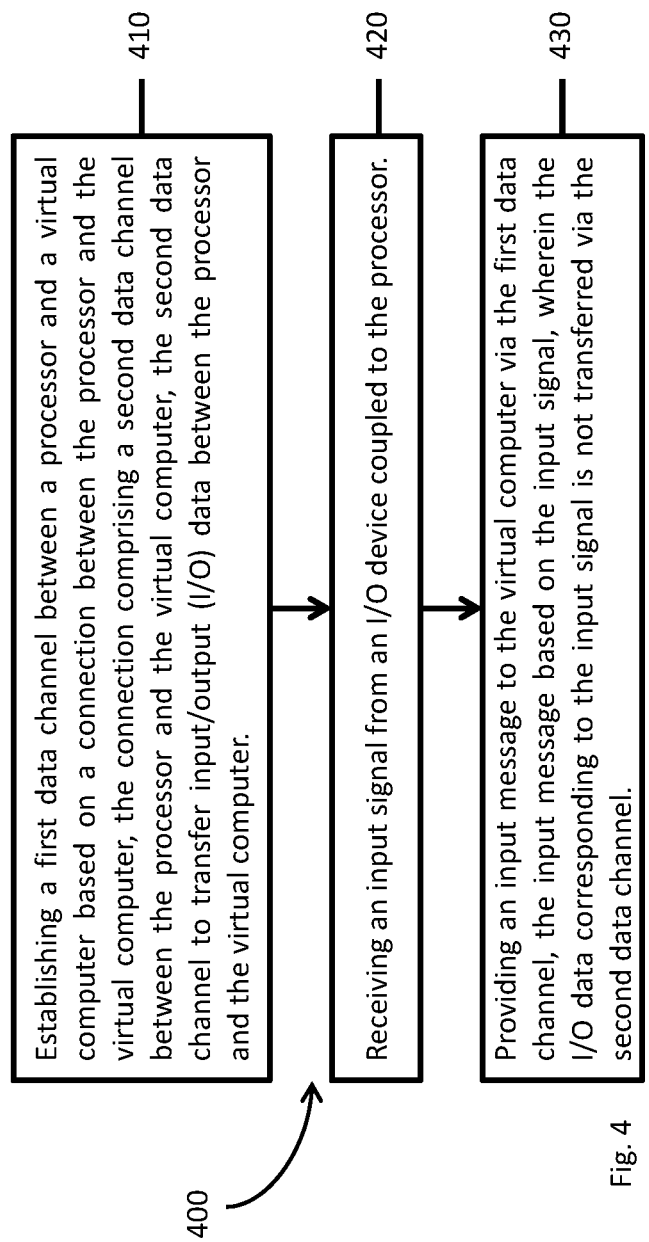
FIG. 4 shows a method of establishing and providing data over a data channel from an I/O device in accordance with various examples.

FIG. 4 shows a method 400 of establishing and providing data over a data channel from an I/O device in accordance with various examples. Method 400 may comprise establishing a first data channel between a processor and a virtual computer based on a connection between the processor and the virtual computer, the connection comprising a second data channel between the processor and the virtual computer, the second data channel to transfer input/output (I/O) data between the processor and the virtual computer 410. Method 400 may comprise receiving an input signal from an I/O device coupled to the processor 420. Method 400 may comprise providing an input message to the virtual computer via the first data channel, the input message based on the input signal, wherein the I/O data corresponding to the input signal is not transferred via the second data channel 430. The I/O data may not be transferred via the second data channel, as the connection between the processor and the virtual computer and its second data channel may not handle that I/O data. For example, the second data channel may handle I/O data in the form of scancodes from a keyboard, indicating when certain keys are pressed or depressed. The keyboard may also include an e-mail button which does not use a keyboard scancode, but provides I/O data in another form, such as via an interrupt, polling, or mapped memory. The data channel may handle I/O data corresponding to a mouse or keyboard, but not from other I/O devices.

Figure 5:
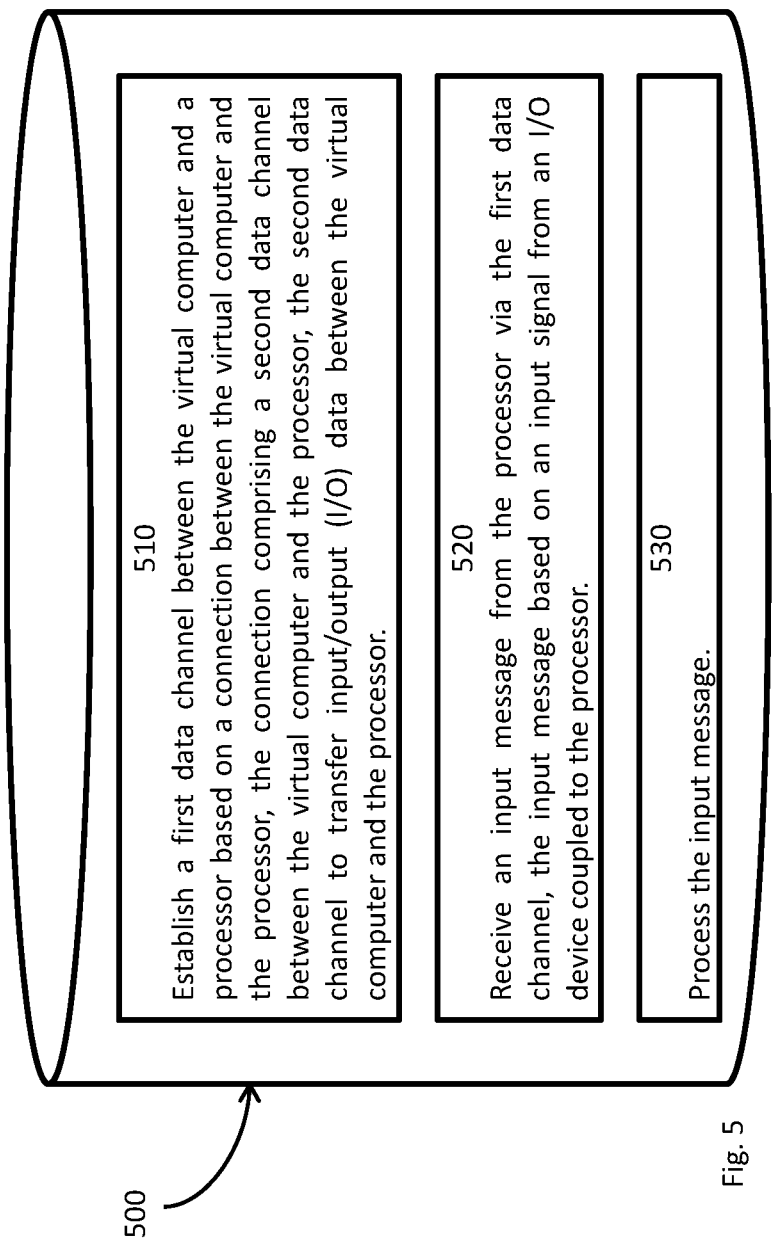
FIG. 5 shows a computer-readable medium with machine-readable instructions to be executed by a virtual computer in accordance with various examples.

FIG. 5 shows a computer-readable medium 500 with machine-readable instructions 510, 520, 530 to be executed by a virtual computer in accordance with various examples. Machine-readable instruction 510, when executed, may cause the virtual computer to establish a first data channel between the virtual computer and a processor based on a connection between the virtual computer and the processor, the connection comprising a second data channel between the virtual computer and the processor, the second data channel to transfer input/output (I/O) data between the processor and the virtual computer. Machine-readable instruction 520, when executed, may cause the virtual computer to receive an input message from the processor via the first data channel, the input message based on an input signal from an I/O device coupled to the processor. Machine-readable instruction 530, when executed, may cause the virtual computer to process the input message.

The machine-readable instructions 510, 520, 530 may be part of an application to be executed by the virtual computer. To establish the first data channel, the application may monitor communications between the virtual computer and the processor, waiting for a request from the processor to establish the connection. The application on the virtual computer may initiate the connection request.

In processing the input message, the virtual computer may analyze information regarding which I/O device or which I/O event caused the input message to be transferred. The application may cause the virtual computer to perform an action similar to what would be performed by the processor. For example, receiving an input message based on the pressing of an e-mail button may cause the virtual computer to open an e-mail application or switch to the window for the e-mail application or close the e-mail application if it is open. In various examples, the application may cause the virtual computer to perform a different action that would be performed by the processor. For example, receiving an input message based on the pressing of a sleep button may cause the virtual computer to begin session shutdown operations and terminate the connection between the virtual computer and the processor.

Figure 6:
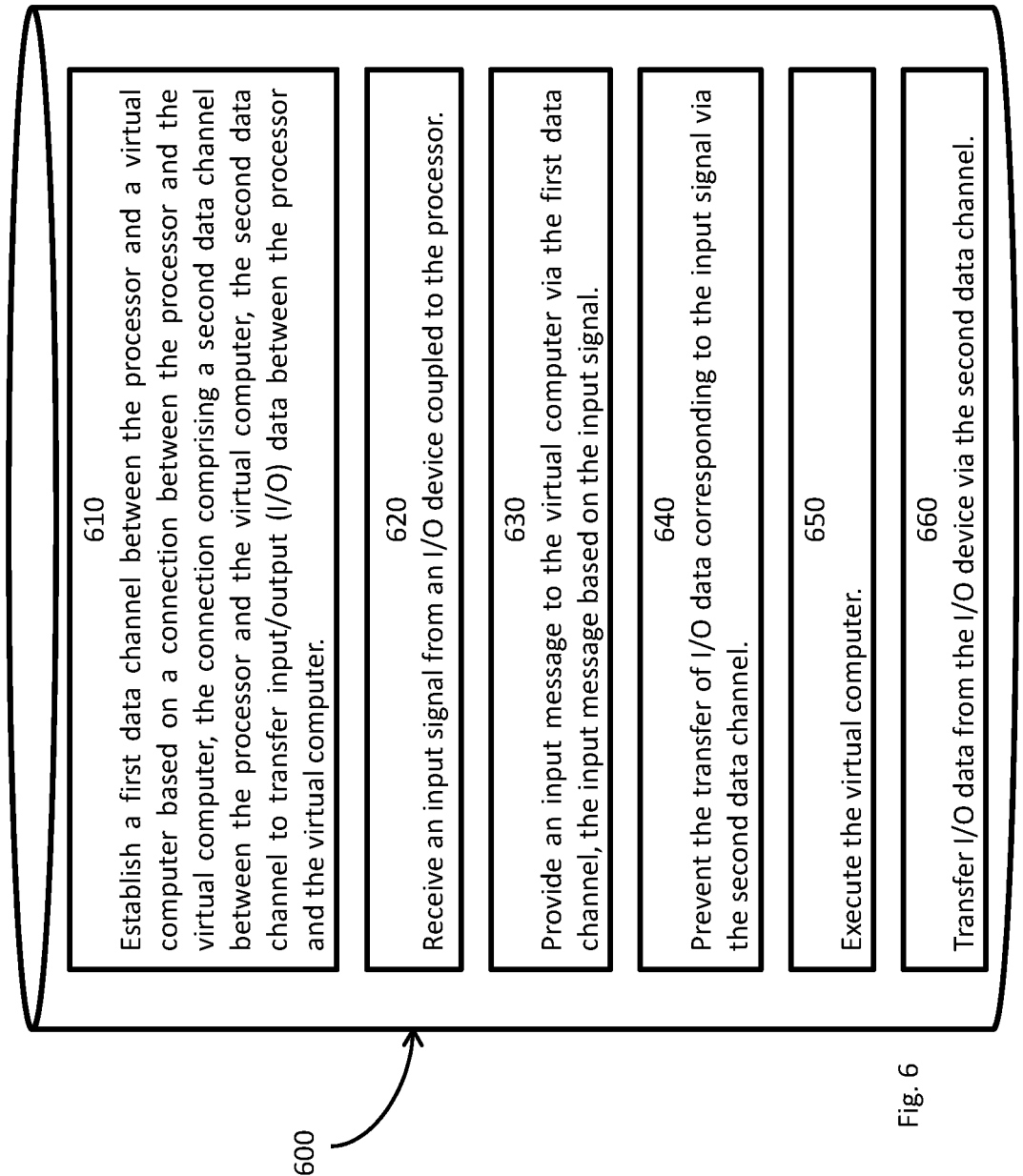
FIG. 6 shows a computer-readable medium with machine-readable instructions to be executed by a processor in accordance with various examples.

FIG. 6 shows a computer-readable medium 600 with machine-readable instructions 610, 620, 630, 640, 650, 660 to be executed by a processor in accordance with various examples. Machine-readable instruction 610, when executed, may cause the processor to establish a first data channel between the processor and a virtual computer based on a connection between the processor and the virtual computer, the connection comprising a second data channel between the processor and the virtual computer, the second data channel to transfer input/output (I/O) data between the processor and the virtual computer. Machine-readable instruction 620, when executed, may cause the processor to receive an input signal from an I/O device coupled to the processor. Machine-readable instruction 630, when executed, may cause the processor to provide an input message to the virtual computer via the first data channel, the input message based on the input signal. Machine-readable instruction 640, when executed, may cause the processor to prevent the transfer of I/O data corresponding to the input signal via the second data channel. Machine-readable instruction 650, when executed, may cause the processor to execute the virtual computer. Machine-readable instruction 660, when executed, may cause the processor to transfer I/O data from the I/O device via the second data channel.

The machine-readable instructions 610, 620, 630, 640, 650, 660 may be part of an application to be executed by the processor. The processor may prevent the transfer of I/O data corresponding to the input signal via the second data channel by filtering the I/O events. The application may be part of a device driver stack or have a corresponding component that is part of the device driver stack. The application may detect a certain I/O event that is for transfer to the virtual computer via the first data channel. The application may indicate that it will handle that certain I/O event, so other applications do not try to handle it. The application may pass other I/O events to other applications, but not pass this certain I/O event to other applications.

In various examples, the virtual computer may be executed on the processor, rather than on a remote server. The data channels may comprise function or procedure calls on the virtual computer for passing data between the processor and the virtual computer being executed by the processor.

In various examples, I/O data from a single I/O device may cause messages to be transmitted via both data channels. For example, pressing "Q," "J," or "Z" on a keyboard may cause a message to be transmitted via the second data channel. Pressing the e-mail button on the keyboard may cause a message to be transmitted via the first data channel.

Figure 7:
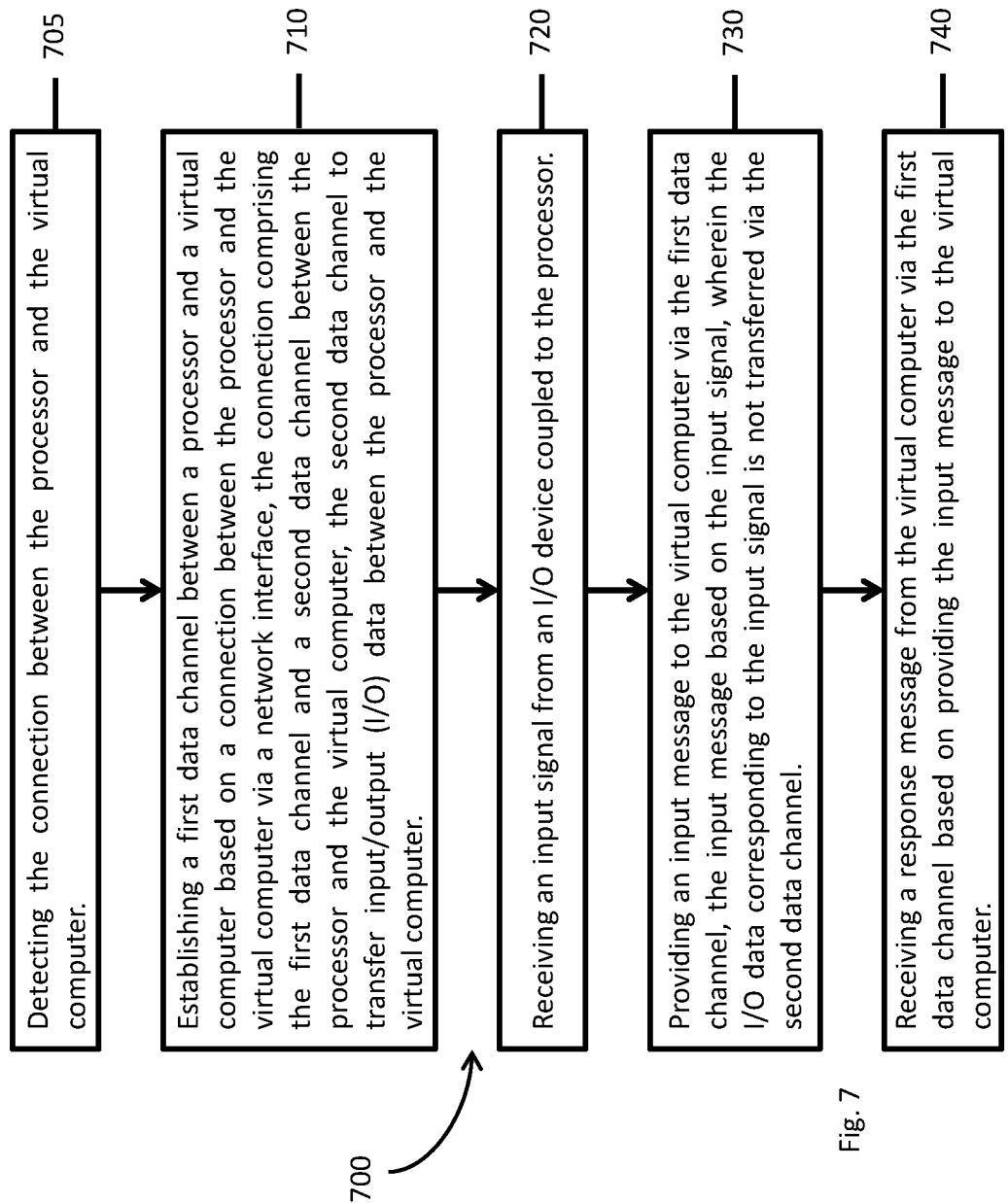
FIG. 7 shows a method of establishing and providing data over a data channel from an I/O device in accordance with various examples.

FIG. 7 shows a method 700 of establishing and providing data over a data channel from an I/O device in accordance with various examples. Method 700 may comprise detecting the connection between the processor and the virtual computer 705. Method 700 may comprise establishing a first data channel between a processor and a virtual computer based on a connection between the processor and the virtual computer via a network interface, the connection comprising the first data channel and a second data channel between the processor and the virtual computer, the second data channel to transfer input/output (I/O) data between the processor and the virtual computer 710. Method 700 may comprise receiving an input signal from an I/O device coupled to the processor 720. Method 700 may comprise providing an input message to the virtual computer via the first data channel, the input message based on the input signal, wherein the I/O data corresponding to the input signal is not transferred via the second data channel 730. Method 700 may comprise receiving a response message from the virtual computer via the first data channel based on providing the input message to the virtual computer 740.

The connection may comprise both the first data channel and the second data channel. The connection may be established first. The second data channel may be established as part of establishing the connection. The first data channel may be established later, after detecting the connection. The first data channel may be established by using functionality of the connection to establish the first data channel. For example, the connection may make use of a remote desktop application, which may allow the creation of virtual channels for the transfer of data. The first data channel may be established by creating a virtual channel through the remote desktop application.

A virtual computer may send a response to the processor after receiving an input message. The response may be an acknowledgement of receipt of the input message. If such acknowledgement is not received, the processor may provide the input message to the virtual computer another time. The response may indicate the input message was successfully processed or indicate an error. The response may indicate some action to be taken by the processor or an I/O device coupled to the local machine. For example, the input signal may have been provided in response to an e-mail button being pressed on a keyboard. After receiving a corresponding input message, the virtual computer may open an e-mail application. The e-mail button may also comprise a light source that illuminates the button if there are new e-mails. If the e-mail application opens up successfully, the virtual computer may send a response to the processor to deactivate the light source. The virtual computer may have detected new e-mails and provided a message to the processor to activate the light source of the e-mail button. If the response indicates an error, the processor may record an error message to an error log.

Figure 8:
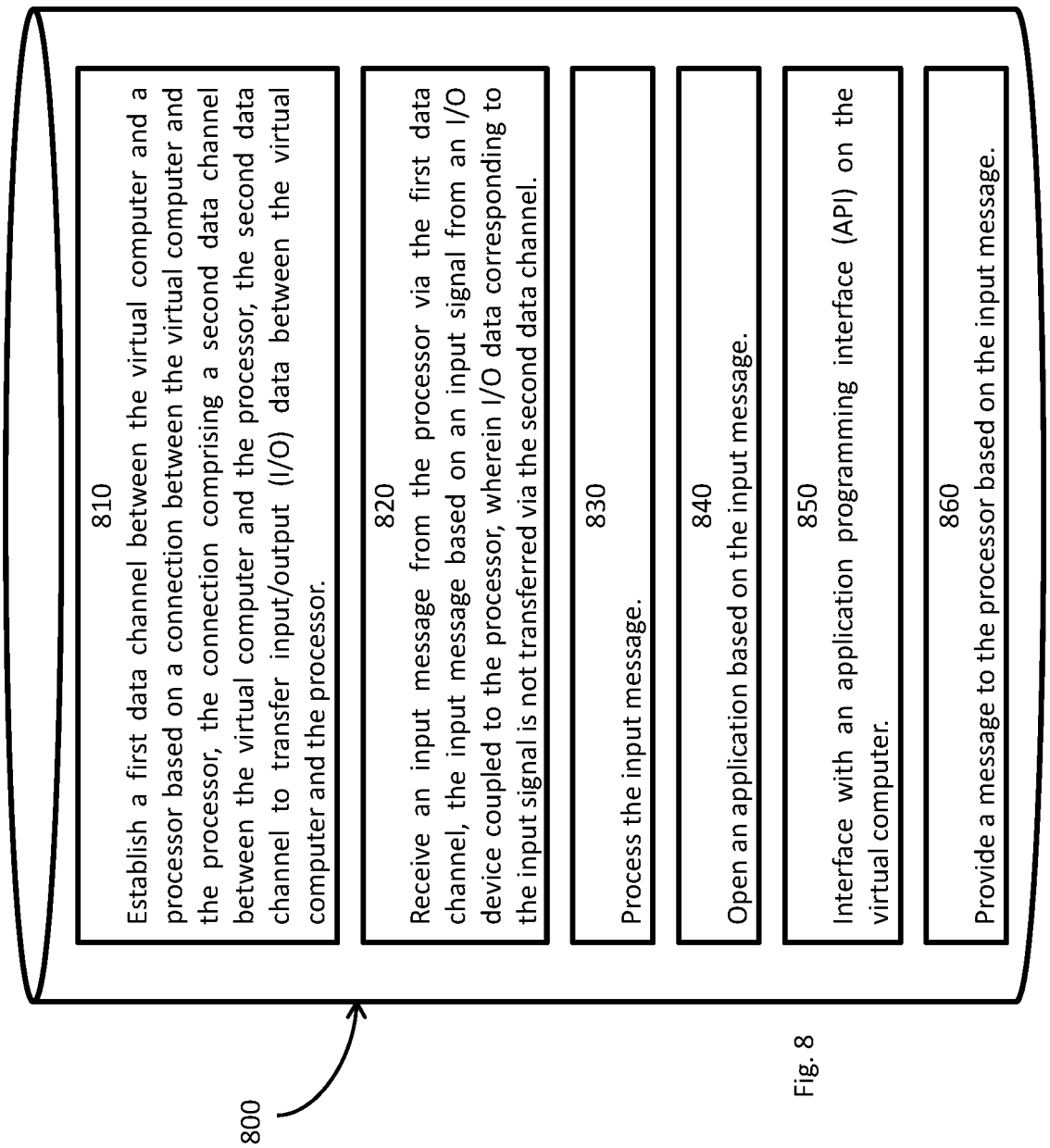
FIG. 8 shows a computer-readable medium with machine-readable instructions to be executed by a virtual computer in accordance with various examples.

FIG. 8 shows a computer-readable medium 800 with machine-readable instructions 810, 820, 830, 840, 850, 860 to be executed by a virtual computer in accordance with various examples. Machine-readable instruction 810, when executed, may cause the virtual computer to establish a first data channel between the virtual computer and a processor based on a connection between the virtual computer and the processor, the connection comprising a second data channel between the virtual computer and the processor, the second data channel to transfer input/output (I/O) data between the processor and the virtual computer. Machine-readable instruction 820, when executed, may cause the virtual computer to receive an input message from the processor via the first data channel, the input message based on an input signal from an I/O device coupled to the processor, wherein I/O data corresponding to the input signal is not transferred via the second data channel. Machine-readable instruction 830, when executed, may cause the virtual computer to process the input message. Machine-readable instruction 840, when executed, may cause the virtual computer to open an application based on the input message. Machine-readable instruction 850, when executed, may cause the virtual computer to interface with an application programming interface (API) on the virtual computer. Machine-readable instruction 860, when executed, may cause the virtual computer to provide a message to the processor based on the input message.

The virtual computer may take an action based on processing of the input message. The action may include interacting with the operating system or another application being executed on the virtual computer. This interaction may be performed by interfacing with an API of the operation system or other application. This interaction may be done by performing function or procedure calls into the API of the operating system or other application. The interaction may be performed through UI automation. For example, the application on the virtual computer may analyze the user interface to find an e-mail icon and emulate a mouse-click on the icon to open the e-mail application.

By way of further example, a computer system may comprise a VoIP device that couples to the computer system via USB. The VoIP device may include a button for answering a VoIP call, a button for hanging up a VoIP call, and a display. The display may be a Liquid Crystal Display (LCD) or based on Light Emitting Diodes (LED). The display may be to display caller identification for incoming calls. The display may be to display a length of the call. The computer system may establish a connection to a virtual computer, such as by executing a remote desktop application. An application on the computer system may establish a first data channel with an application on the virtual computer. I/O events related to the keyboard and mouse of the computer system may be communicated with the virtual computer via a second data channel that is part of the connection. I/O events related to the VoIP device or VoIP calls may be transferred via the first data channel. The virtual computer may detect an incoming VoIP call on a VoIP application running on the virtual computer. The virtual computer may send a message to the processor via the first data channel, communicating a caller identification of the incoming call. If a user presses the button for answering a VoIP call, the application on the processor may send an input message to the virtual computer via the first data channel. The application on the virtual computer may process the input message and use the VoIP application's API to have the VoIP application answer the call. The application on the virtual computer may provide a message to the processor via the first data channel indicating successful processing of the input message, or it may return an error message. The data for the VoIP call may be transferred via the second data channel. The data for the VoIP call may be transferred via a third data channel. If the user presses the button for hanging up a VoIP call, the application on the processor may send an input message to the virtual computer. The application on the virtual computer may use the VoIP application's API to hang up the call. The application on the virtual computer may provide a message to the processor via the first data channel indicating success or failure in processing and acting on the input message.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium storing machine-readable instructions that are, when executed by a processor, to cause the processor to:
   establish a first data channel between the processor and a virtual computer responsive to detection of a connection between the processor and the virtual computer, the connection comprising a second data channel between the processor and the virtual computer, the second data channel to transfer input/output (I/O) data between the processor and the virtual computer;
   receive an input signal from an I/O device coupled to the processor;
   provide an input message to the virtual computer via the first data channel, the input message based on the input signal; and
   prevent the transfer of I/O data corresponding to the input signal via the second data channel.

2. The non-transitory computer-readable medium of claim 1, wherein the processor is to execute the virtual computer.

3. The non-transitory computer-readable medium of claim 1, wherein the I/O data transferred via the second data channel comprises I/O data from the I/O device.

4. The non-transitory computer-readable medium of claim 3, wherein the I/O device comprises a keyboard.

5. The non-transitory computer-readable medium of claim 1, wherein the second data channel is established prior to the first data channel being established.

6. A method comprising:
   establishing a first data channel between a processor and a virtual computer responsive to detection of a connection between the processor and the virtual computer, the connection comprising a second data channel between the processor and the virtual computer, the second data channel to transfer input/output (I/O) data between the processor and the virtual computer;
   receiving an input signal from an I/O device coupled to the processor;
   providing an input message to the virtual computer via the first data channel, the input message based on the input signal; and
   prevent the transfer of I/O data corresponding to the input signal via the second data channel, wherein the I/O data corresponding to the input signal is not transferred via the second data channel.

7. The method of claim 6, further comprising receiving a response message from the virtual computer via the first data channel based on providing the input message to the virtual computer.

8. The method of claim 6, wherein the connection is via a network interface.

9. The method of claim 6, further comprising detecting the connection between the processor and the virtual computer.

10. The method of claim 6, wherein the connection comprises the first data channel.

11. A non-transitory computer-readable medium storing machine readable instructions that are, when executed by a virtual computer, to cause the virtual computer to:
    establish a first data channel between the virtual computer and a processor responsive to detection of a connection between the virtual computer and the processor, the connection comprising a second data channel between the virtual computer and the processor, the second data channel to transfer input/output (I/O) data between the processor and the virtual computer;
    receive an input message from the processor via the first data channel, the input message based on an input signal from an I/O device coupled to the processor; wherein the transfer of I/O data corresponding to the input signal via the second data channel is prevented such that the I/O data corresponding to the input signal is not transferred via the second data channel; and
    process the input message.

12. The non-transitory computer-readable medium of claim 11, wherein the machine-readable instructions are, when executed by the virtual computer, to cause the virtual computer to open an application in response to the input message, wherein the input signal corresponding to the input message includes a request to open the application.

13. The non-transitory computer-readable medium of claim 11, wherein the machine-readable instructions are, when executed by the virtual computer, to cause the virtual computer to interface with an application programming interface (API) on the virtual computer in response to the input message.

14. The non-transitory computer-readable medium of claim 11, wherein the machine-readable instructions are, when executed by the virtual computer, to cause the virtual computer to provide a message to the processor in response to the input message, wherein the message requests performance of an action by the processor.

15. The non-transitory computer-readable medium of claim 12, wherein the input message includes an application identifier identifying the application and an action to be performed by the application, wherein the action to be performed includes opening the application.

* * * * *